2,910,091

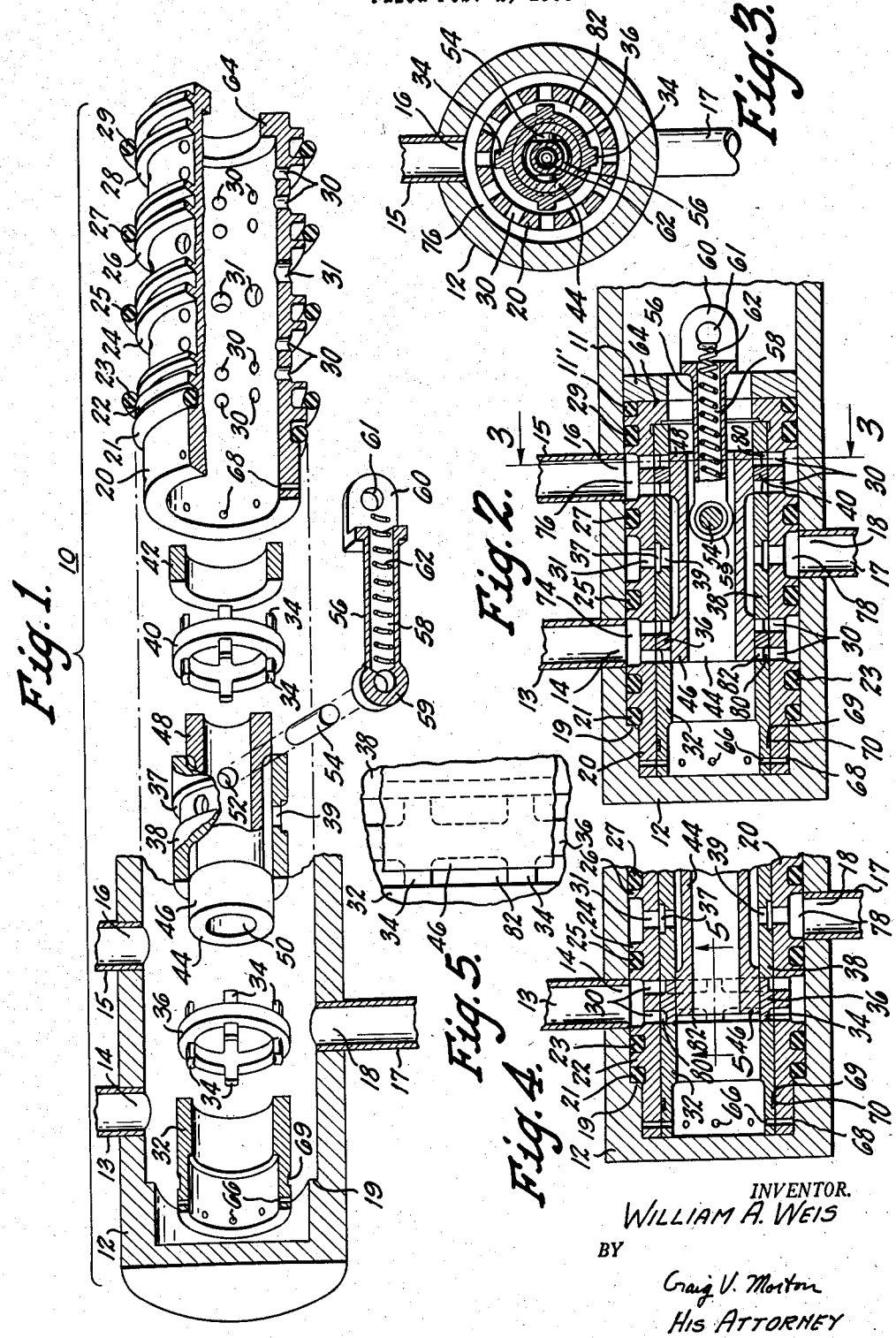
Oct. 27, 1959 — W. A. WEIS — 2,910,091
PERIPHERAL METERING DISTRIBUTOR VALVE
Filed Feb. 2, 1956
INVENTOR.
WILLIAM A. WEIS
BY
Craig V. Morton
His ATTORNEY United States Patent Office 2,910,091
Patented Oct. 27, 1959

PERIPHERAL METERING DISTRIBUTOR VALVE

William A. Weis, Dayton, Ohio, assignor to General Motors Corporation, Detroit, Mich., a corporation of Delaware Application February 2, 1956, Serial No. 563,037

1 Claim. (Cl. 137—625.48)

This invention pertains to valve assemblies, and particularly to an assembly in which a valve plunger having spaced lands cooperating with valve ports initiates and meters distribution of fluid proportional to plunger action even with only small increments of movement.

Heretofore, valves have provided circular openings whereby a substantial movement of the piston or plunger is required to effect flow of fluid through the ports. Round holes provide fluid cooperation with annular land portions. Due to the limited opening in the circular periphery of such holes for fluid flow with linear movement of the lands of the plunger, the initial movement of the plunger is far out of proportion with the amount of fluid flow permitted. The best results would be obtained if rectilinear ports could be provided to cooperate with the annular lands. Mass production operations, however, require ports to be drilled holes so as to reduce the cost of manufacturing such valves. Structural weaknesses resulting in adjoining wall portions when holes are drilled in close relationship to each other preclude such a solution to the problem. Furthermore, if substantially rectilinear port areas were provided in a casing with only small supporting wall portions between ports, there is the danger that the lands may fall, bind, catch or otherwise fail structurally with the port openings.

An object of the present invention is to provide an improved valve assembly in which the valve guide ports communicate with a substantially 360° opening around land portions of a slidable piston valve.

Another object is to provide a valve assembly in which the amount of fluid flow permitted through the ports is proportional to movement of the plunger.

Another object is to provide a liner or sleeve assembly, structurally rigid valve outer guide and cooperating casing whereby spacing means or tangs support lands of a valve, piston, or plunger while almost the entire periphery of the outlet ports of the valve are opened or closed.

Another object is to provide porting ring means cooperable with a sealing land having a plurality of arcuate grooves and land supporting spacing means or tangs therein.

Further objects and advantages of the present invention will be apparent from the following description, reference being had to the accompanying drawings wherein preferred embodiments of the present invention are clearly shown.

In the drawings:

Figure 1 is a partially-sectioned exploded view of the parts in a valve embodying the present invention.

Figure 2 is a longitudinally sectioned view of the valve in Figure 1 in assembled relationship at fluid lock position with the lands of the plunger blocking cooperating port areas.

Figure 3 is an elevational end view of the valve in cross section along line 3—3 of Figure 2.

Figure 4 is a fragmentary sectional view of the valve assembled as in Figure 2 but showing one of the lands axially displaced by a small increment of movement to partially uncover port areas in the subject valve.

Figure 5 is an enlarged fragmentary developed view of the plunger and an annular land portion thereof cooperating with the port area of Figure 4 along line 5—5.

The aforementioned and other objects are accomplished in the present invention by a valve assembly comprising an outer guide or cylinder having a plurality of rows of circumferentially spaced circular openings or holes therein. The guide is concentrically fitted into a sealing engagement with a valve casing or housing. The casing is provided with outlet and inlet ports each of which communicate with an annular chamber formed between the guide and casing by a plurality of annular sealing rings.

The guide has shrink-fitted therein a plurality of sleeves or bushings. A reciprocable valve member, piston, spool or plunger having spaced lands is disposed within the sleeve sections for movement relative thereto. The sleeves which cooperate with a number of ports are capable of being covered or closed by the spaced lands of the plunger and comprise an annular portion or member having a plurality of oppositely extending spacing means, lugs, or tang portions. There may be four of such oppositely extending tangs disposed 90° apart providing a smooth contact bearing between the sections and the lands of the plunger even over the port area.

The space, or annular peripheral grooves, between the tangs on each of these sleeves constitute the port area which is radially and arcuately rectilinear rather than circular to provide proportional flow response with small increments of movement by lands of the spool or plunger relative thereto. The port area differs by the small amount of tang area from the 360° annular chamber for each port formed between the sleeves and the valve casing. In this manner, structural rigidity of the valve casing is maintained while providing substantially 360° of annular port area in addition to permitting use of circular bores for ports in the casing for mass production of the valves. The lugs on the sleeves may be ground or otherwise formed by methods adapted for mass production purposes.

With particular reference to Figure 1, a peripheral metering distributor, or valve assembly, designated by the numeral 10 is shown in an exploded view including a casing, or housing, 12, closed at one end having outlet ports 14 and 16 with conduit fittings 13 and 15, respectively, and an inlet port 18 with conduit fitting 17 longitudinally spaced therein. Also shown is a valve outer guide member, or cylinder, 20, having a plurality of spaced lands 22, 24, 26 and 28 thereon, each of these lands including two shoulder portions with O-ring seals 23, 25, 27 and 29 held therebetween. In addition, a sealing ring 21 is provided cooperating with one-half of the land 22 to engage an inwardly extending annular shoulder 19 formed with the casing 12 near its closed end. The cylinder 20 is drilled with a plurality of longitudinally spaced circumferential radial holes 30 and 31, the purpose of which will be further described below. A plurality of bushings, sections, sleeves, or rings 32, 36, 38, 40 and 42 are axially aligned with the cylinder 20 for assembly concentrically therein to cooperate with a piston, or plunger, 44, having land portions 46 and 48. The ring 38 is provided with an annular recess 37 and radial apertures, or passages, 39, to cooperate with other parts as described below. Porting ring means or rings 36 and 40 are provided with a plurality of oppositely extending spacing means, lugs, or tangs, 34. The piston 44 has a central longitudinal aperture 50 and in an intermediate portion thereof there is a transverse bore 52 extending through diametrically opposite walls of the piston 44 for receiving a pin 54 loosely engaging a piston rod 56. The piston rod 56 is formed with a longitudinal hollow portion 58 integral with a mounting portion 59 for the pin 54 with a flange portion 60 apertured at 61 to receive a pin (not shown) similar to pin 54 for connection to piston actuating means. A spring 62 is compressed into the space 58 between these pins upon assembly of the subject peripheral metering distributor valve.

Figure 2 shows the parts just described in an assembled relationship. The cylinder 20 is provided with an inwardly extending annular shoulder portion 64 and the sleeves 32, 36, 38, 40 and 42 have been press-fitted coaxially to the inner periphery of the cylinder 20 in coaxial alignment as indicated by cooperating apertures 66 and 68 of sleeve 32 and cylinder 20, respectively. An annular recess 69 between the sleeve 32 and cylinder 20 permits silver soldering as at 70, or other suitable fastening means to be used to retain the sleeves and cylinder in assembled relationship. The cylinder 20 is fitted into sealing engagement with the interior periphery of the casing 12 as shown in Figure 2 such that the O-ring seals 23, 25, 27 and 29 form annular port chambers 74 and 76 with the outlet ports 14 and 16. The O-ring seals 25 and 27 form another annular port chamber 78 with inlet port 18 between the cylinder 20 and casing 12. A centrally apertured ring 11 with a sealing means 11' is press-fitted to the inner periphery of casing 12 to hold the parts in assembled relationship. The apertures 30 of the cylinder 20 communicate radially with the chambers 74 and 76 as shown in Figure 2. The apertures 31 of the cylinder 20 communicate with the chamber 78 of the inlet port 18 and with the annular recess 37 of sleeve 38 together with the holes or apertures 39 in the sleeve 38 capable of providing further communication to space about the periphery of the annular portion of piston 44 between the lands 46 and 48 and sleeve 38.

The apertures 30 of cylinder 20 communicate with an annular space, or chamber, 80, formed with each of the rings 36 and 40 at opposite sides of the annular central portion of each of these rings. This chamber 80 connects with a plurality of peripheral, or arcuate, grooves 82 formed circumferentially between the oppositely extending tangs 34 which are kept to a minimum width so as to permit the peripheral, or arcuate, grooves to include the maximum possible rectilinear area communicating with the port chambers 74 and 76 by means of the apertures as outlined above. The port chambers 74 and 76 may be referred to as first chambers and the annular spaces or chambers 80 as second chambers. The tangs 34 are formed with the rings 36 and 40 such that a smooth longitudinal inner surface is formed on which the lands 46 and 48 of the piston 44 may reciprocally slide in cooperation with the other sleeves press-fitted into the cylinder 20.

Figure 2 also shows how the O-ring seal 21 engages the annular shoulder 19 of the casing 12 when the valve assembly is put together as described. The piston rod 56 is shown attached to the piston 44 by means of pin 54 as indicated earlier.

Figure 3 shows an elevational view of the valve in cross section along line 3—3 of Figure 2 showing the casing 12 with the port 16 and conduit fitting 15 communicating with the port chamber 76 through holes 30 of sleeve 20 to the annular space 82. The cross-sectional view also shows tangs 34 disposed between the annular rectilinear peripheral, or arcuate, grooves covered by the land 46 in the valve closed position as in Figure 2. The pin 54 is shown engaging the rod 56 to the piston 44.

Figure 4 is a fragmentary view of the valve assembled as in Figure 2 but showing the piston 44 moved by a small increment to the right so as to uncover port area in the subject valve. In this position, the port 18 is in communication with port 16 in the present embodiment. Figure 5 is an enlarged fragmentary developed view of the relationship between the land 46 and the rectilinear peripheral grooves 82 formed between tangs 34 of the sleeve 36. As can be clearly seen in Figure 5, small increments of initial movement by the land portion 46 open almost 360° annular space to permit communicating flow from or to the port uncovered by such a movement. The peripheral, or arcuate, grooves uncovered differ only from the 360° opening by the areas of the tangs 34 necessary to provide a sliding surface cooperating with the other sleeves and lands 46 of the piston 44. In small increments of movement, the percentage of space taken up by these lugs, or tangs, is very small and the response is proportional throughout the movement of the piston 44 in uncovering such a port due to the rectilinear shape of the passage uncovered.

The piston, or spool, may be moved to the left as viewed in Figure 4 to uncover the port in a manner similar to that shown in Figure 5 in the subject valve to provide communication between the inlet port chamber 78 and the other of the similar outlet ports shown in the preferred embodiment in the accompanying drawings. The flow passes through the conduit, or tube 17, through the port chamber 78 and hole 31 to the annular recess 37 and, hence, to the aperture 39 of the sleeve 38. The port chamber 78 may be referred to as a first chamber and the annular recess 37 a second chamber with the valve piston 44 moved to the right, as shown in Figure 4, the peripheral rectilinear groove 82 cooperating with the space, or chamber, 80, in conjunction with port chamber 76 leading to port 15 and conduit 16. A similar fluid connection occurs when the piston 44 is moved to the left rather than to the right except that communication is then made with port chamber 74 and its port 13 with conduit 14.

The advantages in providing the rectilinear peripheral groove between the tangs of one of the sleeves in accordance with the present invention are clearly illustrated in the drawings. The response is directly proportional to movement covering or uncovering port area and the difficulties encountered by using circular holes, or ports, in conjunction with an annular land of a piston are clearly overcome. For example, if the spool is moved .01 inch to cover or uncover the arcuate grooves of the porting ring means in the present invention, then the area so affected is (.01) times (the circumference minus the small total annular width of the spacing means or tangs) used in the particular valve. If the spool is moved .02 inch to cover or uncover the arcuate grooves of the porting ring means, then the area affected is (.02) times (the circumference minus the small total annular width of the spacing means or tangs) or twice the first area. Thus, it is clear that response of the peripheral metering distributor valve of the present invention is directly proportional to movement covering or uncovering port area with a plunger or spool.

While the embodiment of the present invention as herein disclosed constitutes a preferred form, it is to be understood that other forms might be adopted.

What is claimed is as follows:

A valve assembly comprising a casing having inlet and outlet ports therein, an outer guide cylinder, said outer guide cylinder having a plurality of radially extending flanges sealingly engaged inside said casing to form a plurality of annular chambers between said guide cylinder and said casing, said chambers being disposed so that a specific chamber connects with a particular one of said casing ports, said outer guide cylinder having apertures therein to connect with said annular chambers between said guide cylinder and said casing, a segmented bushing sealingly engaged inside said guide cylinder and having radial apertures therein to connect with said outer guide cylinder apertures, at least one member of said segmented bushing comprising an annular porting ring, a plurality of longitudinal oppositely extending spacing means integral with said porting ring and having inner surfaces coextensive with the inner surface of said porting ring to provide a continuous valve guide surface in conjunction with the inner surface of said segmented bushing, said spacing means being relatively widely circumferentially spaced around said porting ring and having a thickness less than that of said porting ring, the area above said spacing means between the outer surface of said porting ring and the outer surface of said spacing means being of arcuate shape and rectangular cross section, said spacing means abutting adjoining members of said segmented bushing, said porting ring being aligned with specific outer guide cylinder apertures in order to connect with a particular one of said casing ports, and a plunger member having a plurality of lands thereon operatively disposed within said segmented sleeve and cooperating with said porting ring so that fluid flow around said spacing means is directly proportional to plunger movement.

References Cited in the file of this patent

UNITED STATES PATENTS

| | | |
|---|---|---|
| 1,954,442 | Dall | Apr. 10, 1934 |
| 2,516,495 | Waterson | July 25, 1950 |
| 2,630,135 | Johnson | Mar. 3, 1953 |
| 2,781,782 | Gerwig | Feb. 17, 1957 |
| 2,785,699 | Creson | Mar. 19, 1957 |
| 2,808,120 | Hunter | Oct. 1, 1957 |